Patented Jan. 15, 1946

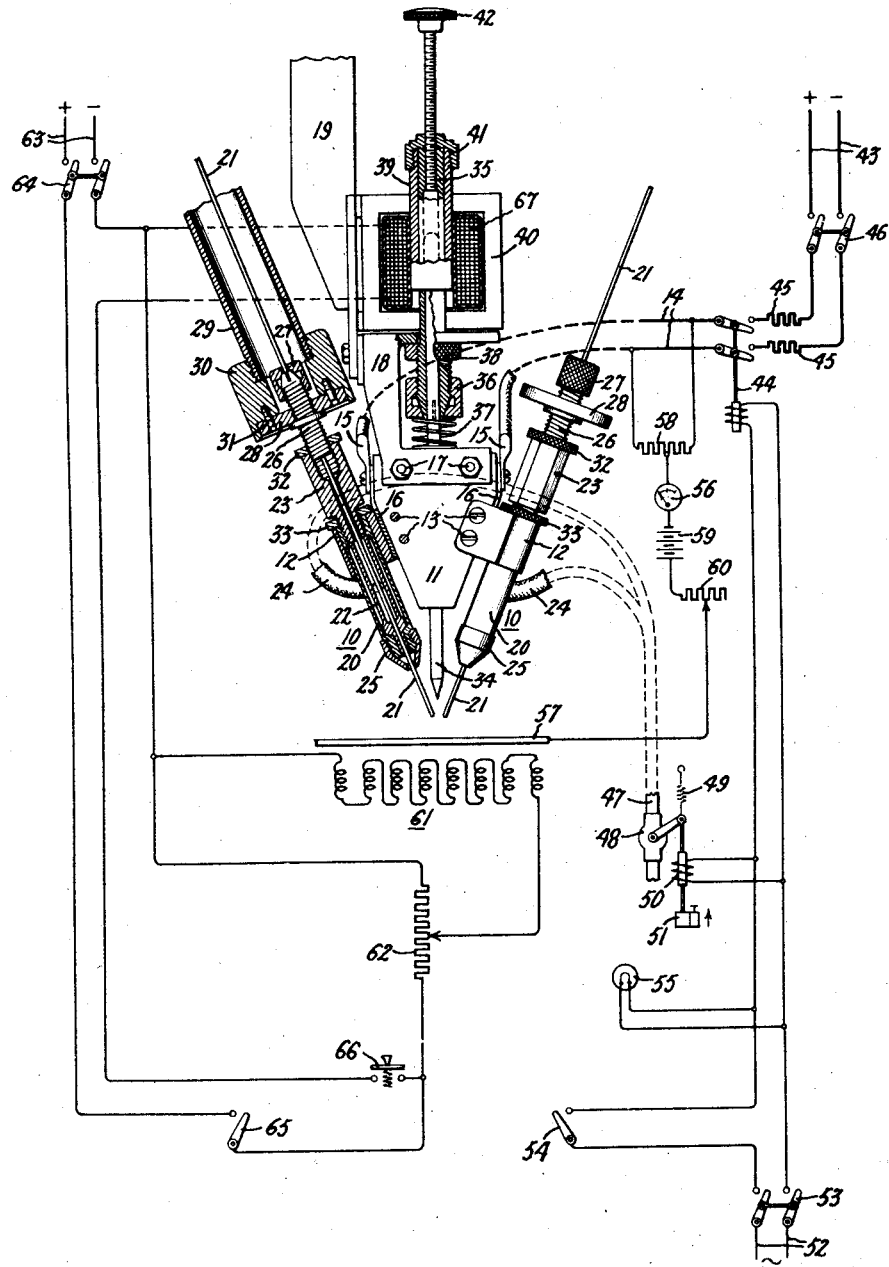

2,393,199

UNITED STATES PATENT OFFICE 2,393,199

WELDING APPARATUS

Gareth G. Somerville, Pittsfield, Mass., assignor to General Electric Company, a corporation of New York Application March 6, 1943, Serial No. 478,236

5 Claims. (Cl. 219—14)

My invention relates to gas-arc welding apparatus which is particularly suited for performing infrequent welding operations of short duration. One application for such apparatus is the butt fusion welding of thin sheets of silicon steel to form strips from which are cut the parts of magnetic core circuits used in electrical apparatus.

It is desirable to use for this purpose an atomic hydrogen torch and to control the arc of such torch by a magnetic field which acts on the arc after spanning a high reluctance air gap directly under the seam between the parts being welded as described and claimed in United States Letters Patent 2,259,118 granted October 14, 1941, on an invention made by me jointly with James T. Catlett.

Since the welding operation is of short duration compared to the operation of positioning and clamping the sheets in welding position, it is desirable to provide apparatus which is best suited for the short duty cycles involved. It is not economically feasible to use an automatic torch for such short welding operations since if it is maintained in operation the gas and electrode consumption is greater than necessary and if intermittently operated, time is required for starting the torch by feeding the electrodes to strike the arc. Furthermore, electrode consumption with such intermittent operation is greater than would be anticipated.

I have found that the oxidizing effects of the surrounding air on the hot arcing terminals of the electrodes of an atomic hydrogen torch after each welding operation account for most of the electrode consumption and that if this consumption due to oxidation is prevented, it is not necessary to provide automatic means for positioning the electrodes relatively to one another with the desired gap since an occasional adjustment is all that is required to compensate for electrode consumption during welding. Consequently an arc welding torch in which the electrodes are held by means providing an occasional manual adjustment may be provided if suitable means are associated therewith for starting the arc and preventing oxidation of the electrodes after each welding operation. It is also desirable when using magnetic means to control the arc to provide an arrangement in which the starting of the arc is prevented until after the magnetic control for the arc has been energized. Such an arrangement insures proper welding conditions from the start of each welding operation which in itself may be of short duration.

It is an object of my invention to provide gas-arc welding apparatus which is particularly suited for performing infrequent welding operations of short duration.

It is a further object of my invention to provide gas-arc welding apparatus which embodies an arc striking mechanism and an electrode feeding mechanism of simplified construction.

Further objects of my invention will become apparent from a consideration of the following description of the welding apparatus illustrated in the single figure of the accompanying drawing.

The welding apparatus illustrated comprises an atomic hydrogen torch embodying means for angularly positioning a plurality of electrodes and manually adjusting them in lengthwise directions to provide a desired gap between their arcing terminals. As in the usual construction of such torches, the electrodes are made of tungsten and means are provided for supplying hydrogen to and about their arcing terminals. In the particular construction illustrated, this means comprises nozzle members through which the electrodes extend and to which gas is supplied from a source through an electromagnetically operated valve. The electrodes are connected through their supporting means to a source of arcing current by an electromagnetically operated switch. This switch and the electromagnetically operated valve means previously referred to are so connected with a source of supply that they may be simultaneously energized and deenergized. When energized, hydrogen and arcing current are immediately and simultaneously supplied to the torch. When deenergized the valve closes a predetermined time interval after the switch opens so that hydrogen is supplied about the hot arcing terminals of the electrodes to protect them from the oxidizing effect of the surrounding atmosphere after each welding operation.

The ionization effect existing during welding between the torch and the work provides a means for adjusting the torch relative to the work through the agency of an indicator. This indicator may comprise a milliammeter connected between the work and the midtap of a resistor whose terminals are connected across the electrodes. A battery and an adjustable resistor in circuit with the milliammeter provides means for adjusting the current flow through the milliammeter and consequently its reading for a desired spacing of the torch relative to the work.

The work clamp is provided with a field magnet for controlling the atomic hydrogen arc in the manner described in the above referred to United States Letters Patent 2,259,118. Since the work clamp forms the subject matter of my application, Serial No. 478,235, filed concurrently herewith, only a diagrammatic representation of its circuits has been illustrated in the accompanying drawing. As shown in the drawing, the windings of the electromagnet are adjustably connected across a voltage divider which is connected to a source of supply. The arrangement is such that when a connection is completed for energizing the field magnet, it is also possible to energize the electromagnet of an arc striking mechanism forming part of the atomic hydrogen torch illustrated.

As shown in the drawing, the atomic hydrogen torch comprises two angularly disposed electrode holders 10 mounted on an insulating support 11 by U shaped clamps 12. These clamps or yokes are held by screws 13 against the angularly disposed side surfaces of support 11 which may be made of insulating material such as Micalex. Arcing current is supplied to the electrode holders and the electrodes therein through conductors 14 whose terminals 15 are connected to copper members 16 located between support 11 and each of the electrode holders with which they make a conductive engagement. These copper members may form parts of holders 10 or clamps 12. It is of course apparent that the electrode holders and their electrical connections may be insulated from one another in any suitable manner and that their support 11 need not be made of insulating material.

Support 11 is attached by bolts 17 to a C shaped frame 18, which in turn is attached to an arm 19 forming part of the welding machine. This arm may be mounted on the travel carriage of a welding machine, and means may be provided for adjustably raising or lowering it and the torch in order to space the arcing terminals of the torch the desired distance from the work. Such an arrangement is shown in my above referred to application.

Each of the electrode holders 10, as best shown in the drawing by the sectional view of one of them, comprises a nozzle member 20 having a tapered seat in its tip portion from which projects the arcing terminal of an electrode 21 extending lengthwise thereof. A collet 22 surrounding this electrode has its tapered end portion in the tapered seat of this nozzle. A screw member 23, one end of which is threaded into the upper portion of the nozzle, acts on the collet and causes it to engage and frictionally hold electrode 21. Gas is supplied to each nozzle through a hose 24. This gas is discharged through the collet and nozzle through a detachable nozzle tip 25 lengthwise of the electrode to and about its arcing terminal. Each electrode 21 is preferably made of tungsten and the gas is preferably hydrogen or a mixture rich in hydrogen.

One end of a second screw member 26 is threaded into the other end of screw member 23 and each of these screw members is provided with a longitudinal passageway for the electrode 21. A collet clamp 27 at the other end of screw member 26 holds the electrode 21 in its longitudinal passageway for rotation therewith.

Screw member 26 is provided with a collar 28 which is attached to and rotates therewith. This collar constitutes means for adjusting screw member 26 relatively to screw member 23 to feed electrode 21 against the frictional holding effect thereon of collet 22. It may be rotated by a hollow handle 29 having a socket 30 which fits over it. Pins 31 in this socket engage corresponding holes in collar 28 to form a driving engagement therewith. The handle and its socket may be made of insulating material or otherwise suitably insulated so that the operator in handling the same does not come into contact with the source of arcing current, which is connected to the electrodes and their holders.

Lock nuts 32 and 33 on screw members 26 and 23 are provided for holding them in adjusted position relative to one another and nozzle 20. Ordinarily nut 33 will be the only one used for this purpose since the frequent adjustments of screw member 26 to compensate for electrode consumption will require a free connection between screw members 23 and 26.

Means, including an arc striking electrode 34 located in the space between electrodes 21, is provided for completing the welding circuit and striking an arc between the arcing terminals of electrodes 21 when withdrawn therefrom. This electrode may be formed of carbon. It extends lengthwise through support 11 and frame 18 for this support into a hollow electrode holder 35. It is held therein by a collet clamp 36 at the lower end of the electrode holder. A spring 37 inserted between frame 18 and collet clamp 36 biases this electrode holder to a retracted position determined by the engagement with frame 18 of an adjusting screw 38 threaded on its lower end. This electrode holder is also provided with an armature 39 forming part of electromagnet 40. This armature is held on the electrode holder by a screw member 41.

A handle 42 attached to and projecting above the electromagnet 40 also provides means for moving the electrode holder against the bias of spring 37. This handle is provided with a portion which is threaded into the upper end of electrode holder 35 for movement lengthwise thereof into engagement with the end of the arc striking electrode 34 located therein. It may be used for adjusting the arc striking electrode lengthwise of its holder after the collet clamp 36 has been loosened. It may also be used to eject broken portions of this arc striking electrode which may obstruct the passageway therein.

As previously stated, arcing current is supplied to electrodes 21 through conductors 14. These conductors are connected with a source of supply 43 through an electromagnetic switch 44, resistors 45, and a hand switch 46. The source of supply may be either alternating current or direct current. If direct current is employed, its positive terminal should be connected to that electrode which is nearer the operator since the positive electrode will burn off more rapidly and will therefore require more frequent adjustments. Resistors 45 together constitute the usual welding resistor employed for arc stabilization purposes. It has been divided and a part inserted in both sides of the welding circuit as a precautionary measure since grounding of one side of the circuit would otherwise interrupt the operation of the welding torch.

As also previously stated, gas is supplied through hoses 24 to each of the nozzles 20 of the electrode holder. These hoses may be connected through a manifold to a hose or pipe line 47 having a valve 48 therein. In the arrangement illustrated, this valve is biased to its closed position by a spring 49 and is opened against this bias by an electromagnet 50 when this electromagnet is energized. Time delay means 51 is provided for delaying for a predetermined time interval the closing of valve 48 after its operating electromagnet 50 has been deenergized. This time delay means may be a dashpot attached to the armature of electromagnet 50 as indicated in the drawing.

The operating windings of the electromagnetic switch 44 and electromagnetically operated valve 48 are connected to a source of alternating current supply 52 through hand switches 53 and 54. Hand switch 54 is a control switch placed near the operator's station. A pilot light 55 is connected for energization and deenergization at the same time that the electromagnetic switch 44 and the electromagnetically operated valve 48 are energized and deenergized.

Instead of associating the time delay means 51 with the operating electromagnet 50 of valve 48, the same result may be accomplished by the interposition of a time delay relay between this electromagnet and the source of supply therefor. For example, a copper jacketed direct current relay connected to the source 52 through a rectifier may be used to control the connection of electromagnet 50 with the source of supply. In such case, valve 48 will be abruptly operated by the energization and deenergization of its electromagnet 50. With the dashpot arrangement illustrated in the drawing, valve 48 will gradually close and consequently should be so constructed that only its final closing movement interrupts the supply of gas to the torch.

The necessary construction of the work holding clamps very often makes it difficult for the operator to observe if the atomic hydrogen arc is properly spaced from the work during welding. In the arrangement illustrated indicating means have been provided for this purpose. This indicating means depends upon the ionization effect existing between the arcing terminals of the electrodes and the work during welding. It comprises a milliammeter 56 connected between the work 57 and a midtap of a resistor 58 whose terminals are connected across the electrodes 21 through conductors 14. A battery 59 and an adjustable resistor 60 in circuit with the milliammeter provide means for adjusting the amount of current flow through the milliammeter. Consequently from a previously determined proper arcing adjustment, the operator can tell by the reading of the milliammeter whether the arc has the desired spacing from the work.

As shown in the above referred to United States Letters Patent 2,259,118, the work clamp may be provided with a field magnet 61 for controlling the atomic hydrogen arc. As shown in the accompanying drawing, the windings of this electromagnet are adjustably connected across a voltage divider 62 with a source of direct current supply 63. In order to obtain a desired magnetic effect at the ends of a seam, the end coils of the field magnet 61 are reversed as has been indicated in the accompanying drawing. These windings and the voltage divider 62 are connected across the source of supply 63 through hand switches 64 and 65. Switch 65 is a control switch located at the operator's station. A push button switch 66 also located at the operator's station completes a circuit from the source of supply 63 through the operating winding 67 of the arc striking electromagnet when both switches 64 and 65 have been closed. Thus after the welding operator has closed switch 65 the closure of the push button 66 will close the arc striking mechanism which then operates to strike an arc between the terminals of electrodes 21 of the welding torch.

In view of the above, the operation of the apparatus described is believed to be quite evident. Briefly it is as follows:

Electrodes 21 are adjusted in their holders 10 to provide the desired gap between their arcing terminals. This is accomplished by adjusting screw members 26 relative to screw members 23 through the agency of handle 29. The electrodes are held in their nozzles 20 by the action of screw members 23 on collets 22 whose lower ends frictionally engage the electrodes. The desired adjustment is maintained through lock nuts 33.

The control circuits may then be engaged by closing switches 46, 53, and 64.

The ends of two sheets of silicon steel may then be placed in the work clamp embodying field magnet 61. This magnet is energized by the closure of switch 65 and its intensity may be adjusted by adjusting the slider on voltage divider 62. Thereafter the operator closes switch 54 which energizes electromagnetic switch 44 and the operating magnet 50 of valve 48. Arcing current and gas are consequently supplied to the torch. This condition is indicated by the signal lamp 55.

The operator then closes push button 66 which energizes coil 67 of the arc striking magnet through a circuit including switch 65. The energization of the arc striking magnet causes the arc striking electrode 34 to bridge the gap between electrodes 21 of the torch. When the operator releases push button 66, the arc striking electromagnet is deenergized and the arc striking electrode 34 is retracted to the position illustrated by the biasing effect of spring 37 forming part of the arc striking mechanism. This should result in the establishment of an arc between the electrodes 21 and consequently place the torch in condition for welding. The torch is then traversed along the seam between the sheets producing a weld between them.

At the end of the welding operation, switch 54 is opened to disconnect the source of arcing current and gas supplied to the torch. Upon the opening of switch 54, the winding of the electromagnetic switch 44 and the winding of the operating electromagnet 50 for valve 48 are simultaneously deenergized, but valve 48 does not close immediately due to the time delay of dashpot 51. Consequently while the arcing terminals of the electrodes 21 are still hot they are protected from the oxidizing effects of the surrounding air by the discharge of hydrogen about their arcing terminals for a predetermined time interval determined by the setting of dashpot 51. This dashpot is adjusted so that the discharge of hydrogen continues until the arcing terminals of the electrode are cooled to a temperature at which the oxidizing effects of the surrounding air are inconsequential. The supply of hydrogen is then cut off by the closing of valve 48.

During welding or between welding operations, an adjustment of the electrodes 21 may be made as previously stated. Also during welding the torch may be adjusted relatively to the work by raising or lowering arm 19 to obtain that reading on the milliammeter 56 which has been found to correspond with the desired arcing condition between the torch and the work.

My invention is not limited to the particular detailed arrangement illustrated and described. Neither is my invention limited to apparatus for atomic hydrogen welding. Since it may in whole or part be applied to other forms of gas-arc welding apparatus, I aim, therefore, to cover in the appended claims all such modifications as fall within the true spirit and scope of my invention as set forth in the appended claims.

What I claim as new and desire to secure by Letters Patent of the United States is:

1. A welding torch comprising an electrode holder, an electrode holding collet seated in said holder, electrode adjusting screws making a threaded engagement with one another and having electrode passageways aligned with one another and the electrode passageways through said collet and said holder, one of said adjusting screws making a threaded engagement with said holder and acting on said collet and the other of said adjusting screws having means for holding an electrode in its longitudinal passageway, and means for rotating said electrode holding adjusting screw relatively to said collet engaging adjusting screw to feed an electrode lengthwise by the electrode engaging surfaces of said collet.

2. A welding torch comprising a tubular electrode holder having a tapered seat in its tip portion from which the arcing terminal of an electrode extending lengthwise thereof projects, a collet surrounding said electrode and having its tapered end portion in said tapered seat of said holder, a screw member threaded on said holder for lengthwise movement into engagement with the end of said collet when rotated about said electrode which projects through a longitudinal passageway in said screw member, a second screw member threaded on said first screw member for lengthwise movement relative thereto when rotated about said electrode which also projects through a longitudinal passageway in said second screw member, means for holding said electrode in said passageway of said second screw member for rotation therewith, and means for rotating said second screw member relatively to said first screw member to feed said electrode against the frictional holding effect of said collet resulting from the action of said first screw member on said collet.

3. A welding torch comprising a tubular electrode holder having a tapered seat in its tip portion from which the arcing terminal of an electrode extending lengthwise thereof projects, a collet surrounding said electrode and having its tapered end portion in said tapered seat of said holder, a screw member threaded on said holder for lengthwise movement into engagement with the end of said collet when rotated about said electrode which projects through a longitudinal passageway in said screw member, a second screw member threaded on said first screw member for lengthwise movement relative thereto when rotated about said electrode which also projects through a longitudinal passageway in said second screw member, means for holding said electrode in said passageway of said second screw member for rotation therewith, means for holding that adjustment of said first screw member on said holder which provides a desired frictional holding effect between said collet and said electrode extending therethrough, and means for rotating said second screw member relatively to said first screw member to feed said electrode against the frictional holding effect of said collet.

4. A welding torch comprising a tubular electrode holder having a tapered seat in its tip portion from which the arcing terminal of an electrode extending lengthwise thereof projects, a collet surrounding said electrode and having its tapered end portion in said tapered seat of said holder, a screw member threaded on said holder for lengthwise movement into engagement with the end of said collet when rotated about said electrode which projects through a longitudinal passageway in said screw member, a second screw member threaded on said first screw member for lengthwise movement relative thereto when rotated about said electrode which also projects through a longitudinal passageway in said second screw member, means for holding said electrode in said passageway of said second screw member for rotation therewith, means including a collar on said second screw member for rotating said second screw member relatively to said first screw member to feed an electrode against the frictional holding effect of said collet resulting from the action of said first screw member on said collet, and a hollow handle having a detachable socket connection making a driving engagement with said collar on said second screw member and providing a longitudinal passageway for that portion of said electrode which projects from said second screw member.

5. A welding torch comprising a plurality of angularly disposed electrode holders, an electrode holding collet seated in each of said holders, a pair of electrode adjusting screws for each of said holders, said adjusting screws of each pair making a threaded engagement with one another and having electrode passageways therethrough aligned with one another and the electrode passageways through said collet and said holder with which they are associated, one of said adjusting screws of each pair making a threaded engagement with its said holder and acting on said collet in said holder and the other of said adjusting screws having means for holding an electrode in its longitudinal passageway, means including a hollow insulated handle having a detachable connection with each of said electrode holding adjusting screws for rotating them relatively to said collet engaging adjusting screws and thereby adjusting the gap between the arcing terminals of said electrodes frictionally held by said collets in said holders, a frame on which said holders are mounted in fixed relationship relative to one another, means for electrically insulating said holders from one another, terminal connections for supplying arcing current to said electrodes through said holders and said collets therein, means including an arc striking electrode holder mounted on said frame between said angularly disposed holders for positioning the terminal of an electrode in said arc striking electrode holder in the space between said electrodes in said angularly disposed holders, means for biasing said arc striking electrode holder to a retracted position in which the terminal of the arc striking electrode therein is withdrawn a predetermined distance from the arcing terminals of said electrodes in said angularly disposed holders, means for adjusting said arc striking electrode in its said holder, means for moving said arc striking electrode holder from its retracted position to a position in which the terminal of said arc striking electrode therein is brought into engagement with the arcing terminals of said electrodes in said angularly disposed holders, said means including an electromagnet mounted on said frame and having an armature coaxial with and attached to said arc striking electrode holder, and a handle attached to said arc striking electrode holder and projecting above said electromagnet.

GARETH G. SOMERVILLE.